(12) United States Patent
McCarthy et al.

(10) Patent No.: US 7,137,284 B2
(45) Date of Patent: *Nov. 21, 2006

(54) CHAIN CUTTER

(75) Inventors: Robert E. McCarthy, Crete, IL (US);
John L. Verre, Orland Park, IL (US);
Douglas A. Bakker, Crown Point, IN (US)

(73) Assignee: Vindee Industries, Inc., Frankfort, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/214,368

(22) Filed: Aug. 29, 2005

(65) Prior Publication Data

US 2005/0279150 A1 Dec. 22, 2005

Related U.S. Application Data

(63) Continuation of application No. 11/031,192, filed on Jan. 7, 2005, now abandoned, which is a continuation of application No. 10/404,462, filed on Apr. 1, 2003, now Pat. No. 6,880,378, which is a continuation of application No. 09/909,126, filed on Jul. 18, 2001, now abandoned.

(51) Int. Cl.
*B21D 28/00* (2006.01)

(52) U.S. Cl. .............................. 72/326; 83/605; 83/673

(58) Field of Classification Search ................. 72/326, 72/325; 83/589, 605, 673, 674, 694, 522.19
See application file for complete search history.

(56) References Cited

U.S. PATENT DOCUMENTS

| | | |
|---|---|---|
| 1,469,667 A | 10/1923 | Pleister |
| 2,465,392 A | 3/1949 | Nickell |
| 2,915,822 A | 12/1959 | Kazunosuke |
| 2,993,275 A | 7/1961 | Kazunosuke |
| 3,516,587 A | 6/1970 | Ferrentino |
| 3,916,662 A | 11/1975 | Arnold |
| 3,996,782 A | 12/1976 | Sgariglia |
| 4,012,934 A | 3/1977 | Stone et al. |
| 4,887,447 A | 12/1989 | Schweitzer |
| 4,998,351 A * | 3/1991 | Hartmeister ................. 30/228 |
| 5,272,811 A * | 12/1993 | Armand ........................ 30/228 |
| 5,361,663 A | 11/1994 | Hayes et al. |
| 5,927,622 A | 7/1999 | Zoellinger |
| 6,053,264 A | 4/2000 | Frankel et al. |
| 6,092,290 A * | 7/2000 | Vogelsanger ................. 30/228 |
| 6,418,829 B1 | 7/2002 | Pilchowski |

FOREIGN PATENT DOCUMENTS

CA 1037700 9/1978

* cited by examiner

*Primary Examiner*—Daniel C. Crane
(74) *Attorney, Agent, or Firm*—Leydig, Voit & Mayer, Ltd.

(57) ABSTRACT

A compact chain cutting apparatus for automatically shearing and opening a chain link of a selected thickness in one operation is disclosed. The apparatus includes a housing, a first shearing member, a second shearing member, and an electro-hydraulic actuator system. The first shearing member is mounted to the housing. The second shearing member is pivotally mounted to the housing for movement to exert, in cooperation with the first shearing member, shearing and bending forces upon the chain link. The electro-hydraulic actuator system cooperates with the second shearing member to move automatically the second shearing member to shear and to bend the chain link, thereby defining an opening in the chain link greater than the thickness of the link.

14 Claims, 10 Drawing Sheets

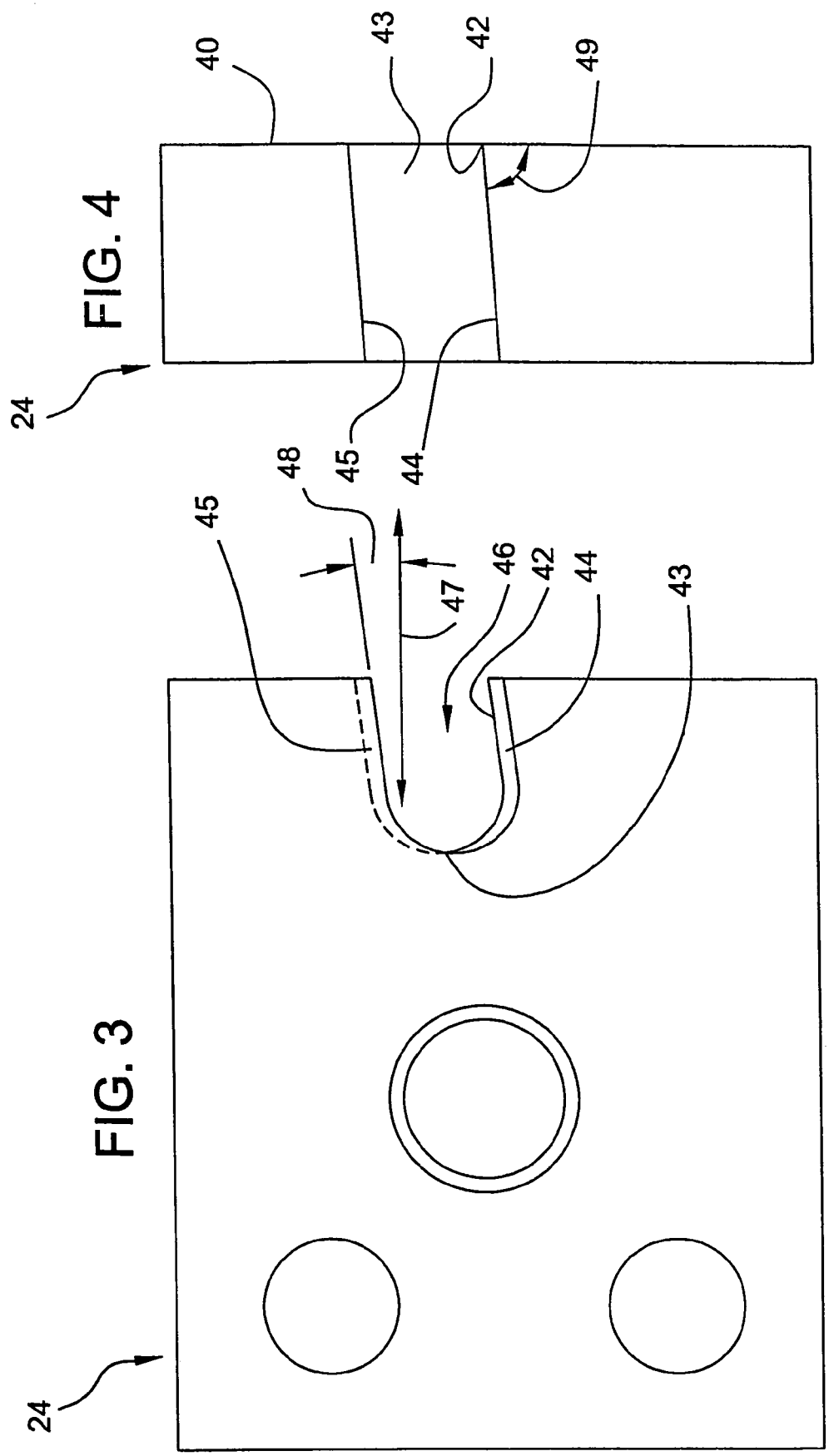

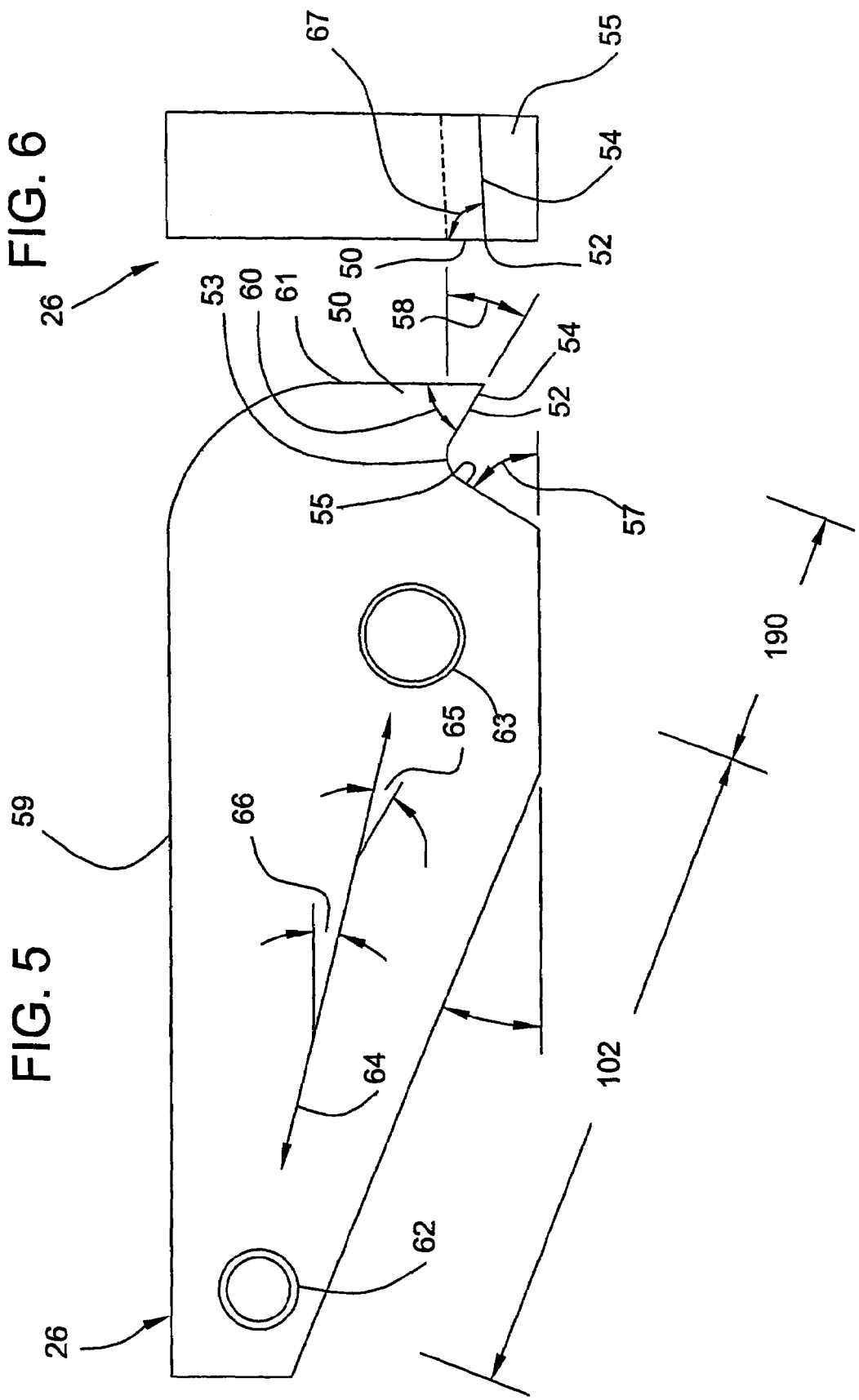

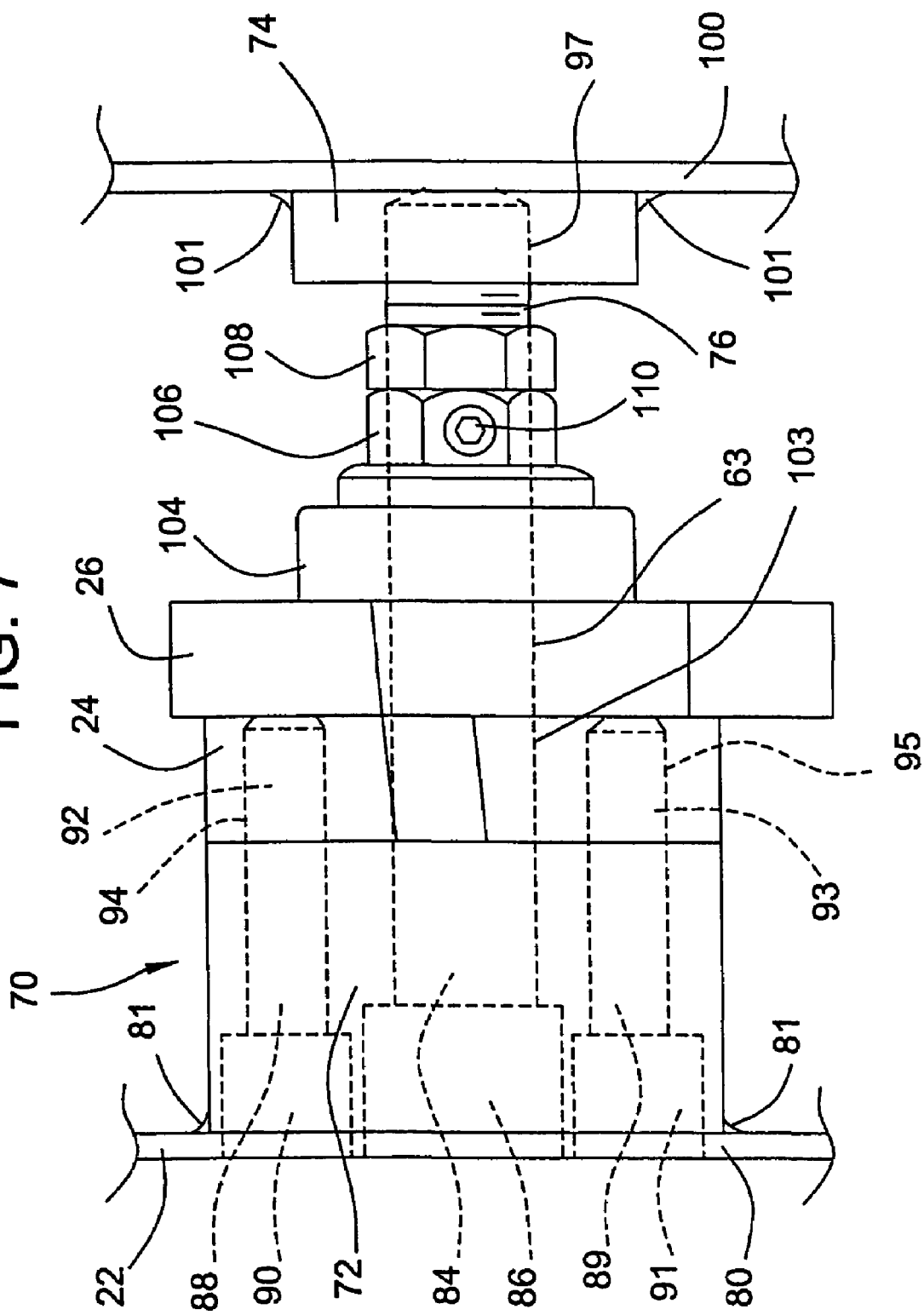

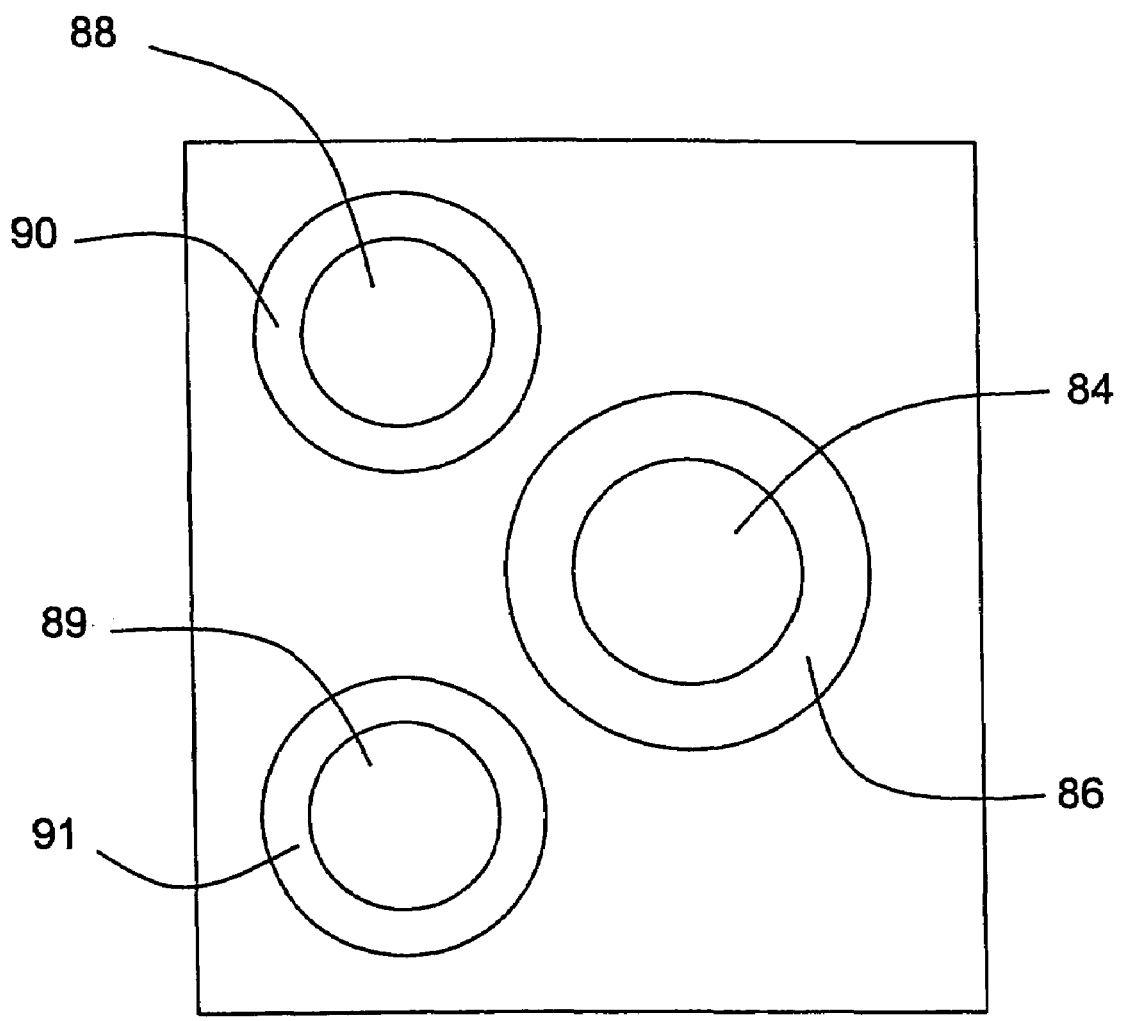

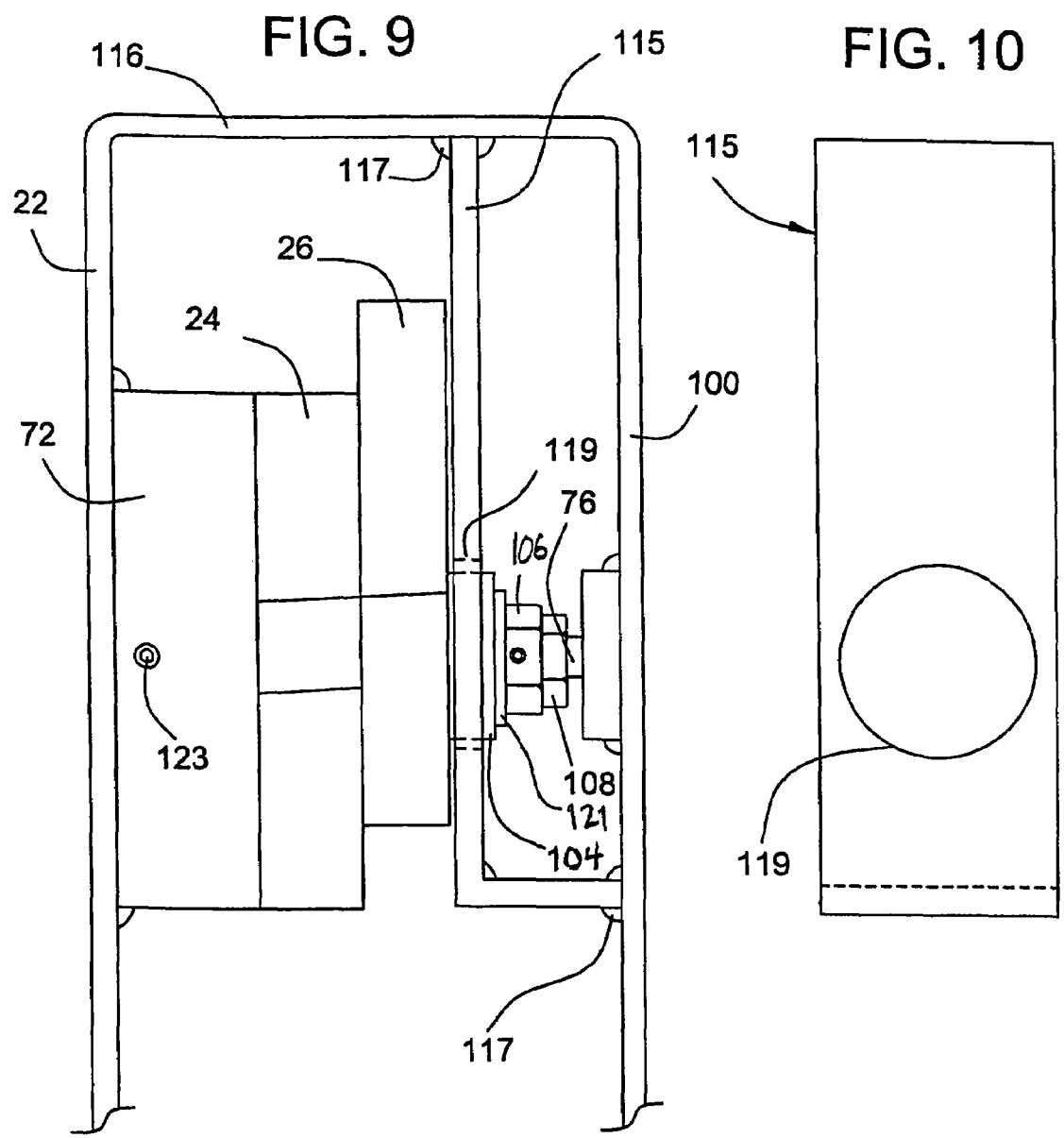

CHAIN CUTTER

RELATED APPLICATION

This application is a continuation of U.S. application Ser. No. 11/031,192, filed Jan. 7, 2005, now abandoned which is a continuation of U.S. application Ser. No. 10/404,462, filed Apr. 1, 2003, now U.S. Pat. No. 6,880,378, which is a continuation of U.S. application Ser. No. 09/909,126, filed Jul. 18, 2001, now abandoned, the entire contents of which are hereby incorporated by reference in their entireties.

FIELD OF THE INVENTION

The present invention relates generally to a chain cutting apparatus, and more particularly to an automatically operated, electro-hydraulically actuated apparatus for cutting and opening chain links.

BACKGROUND OF THE INVENTION

In retail establishments selling chain and in light manufacturing facilities, chain is generally cut by either sawing through the chain links or by using a cold forming pincher-type tool commonly called a "bolt cutter." While these techniques are adequate for cutting small gauge chains, the same techniques raise a number of practical problems in cutting larger gauge chains.

In the case of sawing through a link, the most serious problem arises from the necessity to support the chain link rigidly in a vice or other clamping apparatus while a hack saw is employed to saw through the link at a point along its circumference. If only one cut is made through the link, some means of bending the link must be employed in order to create an opening between the severed ends large enough to allow the cut link to be disengaged from the connecting links. This additional operation necessarily involves the use of a second tool, whether it be a lever-type instrument to pry open the link or an impact-type instrument to hammer the link open. The bending operation can be eliminated by sawing through the link at a second point, thereby bisecting the link. This second cutting operation is time consuming and difficult when dealing with heavy gauge chains.

When a bolt cutter or similar tool is used, again it is necessary either to cut the link in two places or employ supplemental means to bend the cut link open. Another problem arises because of the difficulty in holding the tool; namely, the risk that the cutting edges will be abused.

Moreover, sawing cable or wire rope to cut it causes fraying at the cut ends. Cutting cable or wire rope by cold forming techniques is only effective if the working edges of the "bolt cutter" are maintained adequately to sever the individual strands of the cable. It is often difficult to so maintain the edges when, as a result of economy, the same tool is used on chain, bolts, cable, and other like materials.

A manually operated, hydraulically actuated apparatus for both cutting and opening chain links, for example, as shown and described in U.S. Pat. No. 3,996,782, has been used to solve some of the problems of the prior art. Although such a device has many desirable features and advantages, there remain certain problems with this cutter.

For example, the manual chain cutter using a manual pump jacks is prone to fluid leakage, labor intensive to operate, slow and under-powered for cutting certain sizes of chain link. The seals in the apparatus have a tendency to wear out and allow fluid leakage to occur. In operation, the apparatus typically requires priming before the apparatus can be used to cut. When cutting a chain link of larger gauge, the pump jack often must be pumped over fifty times in order to successfully cut and open the chain link. Furthermore, maintaining the manual pump jacks can be cumbersome.

In view of the foregoing, there exist various needs in the art. One such need is for a compact, durable chain cutter which provides uniform, consistent speed and power during cutting. A further need exists for a chain cutter that is fast and easy to operate. Additionally, it would be desirable for the chain cutter to be safe to use and operable only by authorized personnel.

SUMMARY OF THE INVENTION

The present invention addresses the foregoing and other needs by providing an automatically-operated, hydraulically-actuated apparatus for cutting and opening chain links. In one aspect of the present invention, there is provided an automatic apparatus for shearing and bending a chain link of a selected thickness. The apparatus includes a housing. A first shearing member is mounted to the housing. A second shearing member is pivotally mounted to the housing for movement to exert, in cooperation with the first shearing member, shearing and bending forces upon the chain link. An electro-hydraulic actuator system is provided to move automatically the second shearing member to shear and to bend the chain link, thereby defining an opening in the chain link greater than the thickness of the link.

The first shearing member has a shearing surface defining a shearing plane and terminating in a first shearing edge. The first shearing member includes a jaw. The jaw has a primary bearing surface to exert shearing and bending forces upon the chain link and a secondary bearing surface for preventing unrestrained twisting during the shearing and bending operations. The jaw defines an opening configured to accommodate the thickness of the chain link.

The second shearing member has a shearing surface disposed substantially parallel to the shearing plane and terminating in a second shearing edge. The second shearing member includes a primary bearing surface to exert shearing and bending forces upon the chain link. The second shearing member is arranged with the first shearing member for relative shearing action along the shearing plane between the primary bearing surfaces and the shearing edges.

The electro-hydraulic actuator system requires no manual actuation force input. The actuator system includes a hydraulic cylinder, a pump, a reservoir, and an electric motor. The hydraulic cylinder has a base and a driving rod with a distal end. The base is pivotally mounted to the housing. The distal end of the rod is mounted to the second shearing member for moving the second shearing member. The pump is fluidly connected to the cylinder for driving the cylinder. The reservoir has a quantity of hydraulic fluid. The pump is fluidly connected to the reservoir for drawing the hydraulic fluid from the reservoir and pumping the hydraulic fluid under pressure to the hydraulic cylinder. The motor is operatively connected to the pump for selectively driving the pump.

Significantly, the actuator system requires no priming before operation and moves the second shearing member smoothly and consistently through a substantially uniform stroke at a steady velocity.

Advantageously, the present invention provides an automated apparatus for cutting and opening in a single operation a chain link, thereby minimizing the time, energy, and equipment required. Furthermore, the apparatus is capable of cutting not only chain but also bolts, wire rope, and the like.

Advantageously, the present invention provides an automated chain cutting apparatus which is compact, powerful enough to operate on chain links of heavy—as well as light—gauge, and composed of relatively inexpensive components, to fulfill the cutting needs of retail establishments and light manufacturing facilities.

By eliminating the need to cut the chain link by manual exertion, the present invention can be used by a wide range of users and requires very little physical exertion on the part of the user. The chain cutting apparatus can be about six times as fast as a prior art manual chain cutting apparatus in cutting a chain link. Furthermore, no priming is required before operating the apparatus.

As a further feature, the chain cutting apparatus can be provided with a keyed switch for operating the motor. Advantageously, the switch can be biased to an off position such that the apparatus stops running once the operator releases the key.

These and other objects and advantages, as well as additional inventive features, of the present invention will become apparent to one of ordinary skill in the art upon reading the detailed description, in conjunction with the accompanying drawings, provided herein.

BRIEF DESCRIPTION OF THE DRAWINGS

FIG. 3 is a side elevational view of a first, stationary shearing member of the chain cutting apparatus of FIG. 1;

FIG. 4 is an end elevational view of the stationary shearing member of FIG. 3;

FIG. 5 is a side elevational view of a second, movable shearing member of the chain cutting apparatus of FIG. 1;

FIG. 6 is a an end elevational view of the movable shearing member of FIG. 5;

FIG. 7 is a fragmentary front elevational view as in FIG. 2 of a support system of the chain cutting apparatus of FIG. 1;

FIG. 8 is a side elevational view of a mounting block of the chain cutting apparatus of FIG. 1

FIG. 9 is a fragmentary front elevational view of another embodiment of a support system for a chain cutting apparatus according to the present invention;

FIG. 10 is a side elevational view of a cutter keeper of the support system of FIG. 8;

DETAILED DESCRIPTION OF EMBODIMENTS OF THE INVENTION

Figure 1:
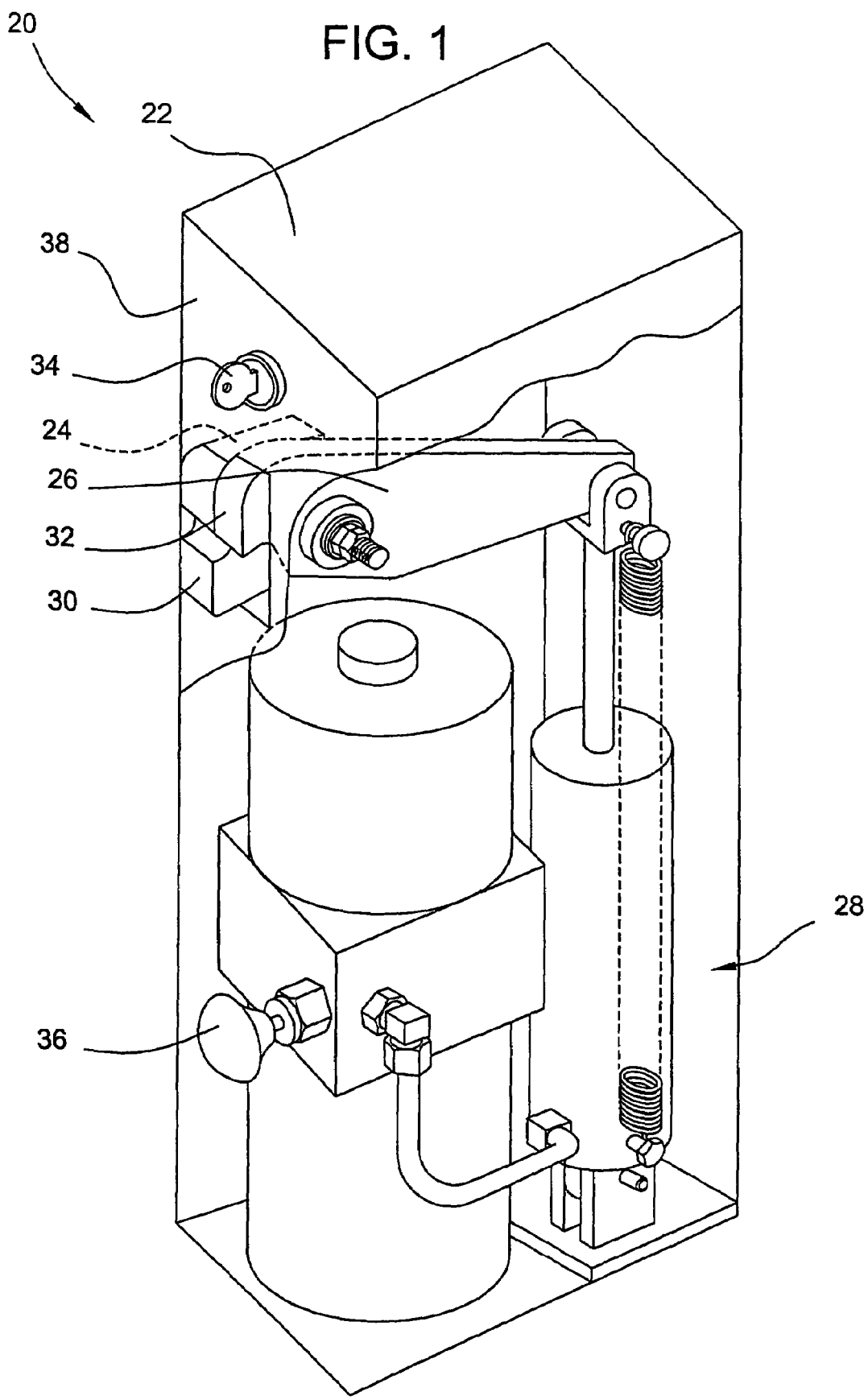
FIG. 1 is a perspective view of an automatic chain cutting apparatus according to the present invention.

Shown in the drawings is an illustrative apparatus for cutting and opening chain links and bolts and for severing steel wire sold, for example, in hardware stores and material supply depots. The illustrative chain cutter shown herein improves upon and solves some of the drawbacks associated with the chain cutter shown and described in U.S. Pat. No. 3,996,782, filed Jul. 17, 1975, and entitled "Chain Cutting Apparatus," which is incorporated herein in its entirety by reference.

The instant apparatus employs a pair of shearing members which interact to first shear a link of chain at a point along its circumference and then to bend the link. The latter operation of opening the link to permit the disengagement of the severed link is more efficient, energy wise, than generating a second cut to facilitate removal of the link. To allow a wide range of operators to use the chain cutting apparatus, an automatic actuator system is provided to operate automatically at least one of the shears to perform the shearing and bending operations. The apparatus is self-contained, lightweight, and, requiring only a 110VAC-convenience outlet for its power source, readily transportable. The small size of the apparatus, approximately one half cubic foot, for example, contributes to its overall portability.

Turning now to the drawings, there is shown in FIG. 1 an illustrative cutting apparatus 20 in accordance with the present invention for automatically shearing and bending a chain link of a selected thickness. The apparatus 20 includes a housing 22, a first shearing member 24 mounted to the housing 22, a second shearing member 26 pivotally mounted to the housing 22 for movement to exert, in cooperation with the first shearing member 24, shearing and bending forces upon the chain link, and an electro-hydraulic actuator system 28 cooperating with the second shearing member 26 to move automatically the second shearing member 26 to shear and to bend the chain link, thereby defining an opening in the chain link greater than the thickness of the link.

The housing 22 supplies support for the first and second shearing members 24, 26 and the actuator system. The housing 22 also serves to contain the mechanism in a compact, regularly shaped package easily adapted to be mounted free standing on legs, or attached directly to a point-of-purchase chain display unit. Because of typical space limitations at the point of use, the size of the housing is desirably very compact, for example, approximately one half cubic foot. To provide a path for the exchange of outside air with the cavity of the housing, a plurality of vent holes can be disposed in the housing.

The shearing and bending portions 30, 32 of the first and second shearing members 24, 26, respectively, a key 34 for operating the apparatus 20, and a "dump" valve 36 for resetting the actuator system 28 such that the second shearing member 26 is in an open position project through a front cover 38 of the housing 22 for ready access by the operator.

The first and second shearing members 24, 26 are utilized for the shearing and bending operations described above. The first shearing member 24 is a stationary shearing member while the second shearing member 26 is a movable shearing member in the form of a pivotable lever.

Figure 2:
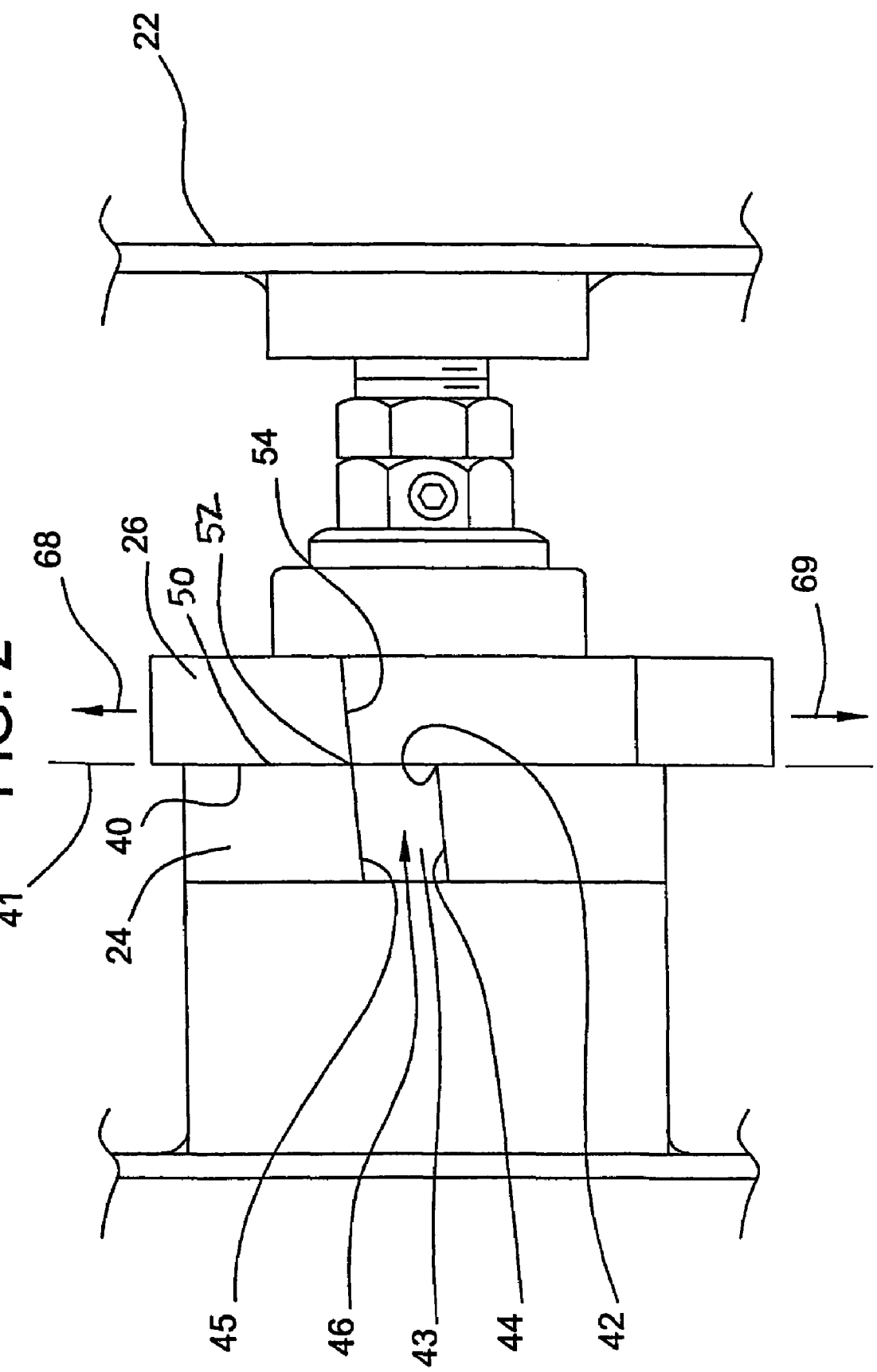
FIG. 2 is a fragmentary front elevational view of the chain cutting apparatus of FIG. 1 with a portion of the housing removed.

Referring to FIGS. 2–4, the first shearing member 24 includes a shearing surface 40 that defines a shearing plane 41 and terminates in a first shearing edge 42. The first shearing member 24 includes a generally U-shaped jaw 43. The jaw 43 has a primary bearing surface 44 to exert shearing and bending forces upon the chain link and a secondary bearing surface 45 for preventing unrestrained twisting during the shearing and bending operations. The primary bearing surface 44 and the secondary bearing surface 45 are disposed substantially parallel to each other. The jaw 43 defines an opening 46 configured to accommodate the thickness of the chain link.

The secondary bearing surface 45 and a longitudinal axis 47 of the first shearing member define a jaw angle 48 that is preferably between about 2.5° and about 7.5°, and more preferably about 5°. The shearing surface 40 and the primary bearing surface 44 of the first shearing member 24 define a rake angle 49 where the primary bearing surface 44 and the shearing surface 40 meet to form the first shearing edge 42 that is slightly less than 90°, preferably between about 88° and about 90°, even more preferably about 89°.

Referring to FIGS. 2 and 5, the second shearing member 26 is shown. The second shearing member 26 includes a shearing surface 50 that is disposed substantially parallel to the shearing plane 41 and terminates in a second shearing edge 52. The second shearing member includes a jaw 53 which has a primary bearing surface 54 and a nip surface 55. The primary bearing surface 54 and the nip surface 55 define a jaw angle 57 that is preferably between about 85° and about 95°, and more preferably about 90°.

The second shearing member 26 includes the primary bearing surface 54 to exert shearing and bending forces upon the chain link. The primary bearing surface 54 is disposed at a first bearing angle 58 relative to an upper edge 59 of the second shearing member 26 that is preferably between about 25° and 35°, and more preferably about 30°. The primary bearing surface 54 is preferably disposed at a second bearing angle 60 relative to a front edge 61 of the second shearing member 26 that is preferably between about 55° and 65°, and even more preferably about 60°.

The second shearing member includes a power transmission hole 62 and a fulcrum hole 63. The transmission and fulcrum holes 62, 63 define a lever arm axis 64. The primary bearing surface 54 and the lever arm axis 64 define a third bearing angle 65 that is preferably between about 2.5° and 7.5°, and even more preferably about 5°. The upper edge 59 and the lever arm axis 64 define a lever arm angle 66 that is preferably between about 22.5° and 27.5°, and even more preferably about 25°.

Referring to FIG. 6, in a preferred embodiment of the invention, the shearing surface 50 and the primary bearing surface 54 of the second shearing member 26 define a rake angle 67 where the primary bearing surface 54 and the shearing surface 50 meet to form the second shearing edge 52 that is slightly less than 90°, preferably between about 88° and about 90°, and even more preferably about 89°. This configuration serves to assure that, even after minor retouching of the second shearing edge 52 should it become dull or chipped, the shearing edge 52 will contact the material to be sheared prior to contact by the primary bearing surface 54. This sequence of contact facilitates clean shearing action.

It will be understood that other combinations of angles within the tolerances shown are possible.

Referring to FIG. 2, the second shearing member 26 is pivotally mounted to the housing 22 for movement substantially parallel to the shearing plane 41 as indicated by a pair of arrows 68, 69 in FIG. 2. The second shearing member 26 is movable between an open position and a range of cutting positions. The shearing surface 50 of the second shearing member 26 is disposed substantially parallel to the shearing plane 41 and terminates in the second shearing edge 52. The primary bearing surface 54 of the second shearing member 26 faces in the opposite direction from the primary bearing surface 44 of the first shearing member 24. The second shearing member 26 is cooperatively arranged with the first shearing member 24 for relative shearing action therebetween. The relative shearing action occurs along the shearing plane 41 between the shearing edges 42, 52 and the primary bearing surfaces 44, 54 of the first and second shearing members 24, 26, respectively.

When the second shearing member 26 is in the open position, the first and second shearing edges 42, 52 of the first and second shearing members 24, 26, respectively, are disposed apart from each other. The travel of the movable shearing member 26 from the open position to a cutting position comprises a cut and open stroke.

In operation, the shearing members 24, 26 cooperate to shear the chain link along the shearing plane 41. The primary bearing surface 54 and the second shearing edge 52 of the second shearing member 26 move toward and beyond the primary bearing surface 44 and the first shearing edge 42 of the first shearing member 24. Shearing the chain link defines a pair of severed ends in the chain link. The shearing members 24, 26 cooperate to bend the severed ends apart while the chain link is restrained against excessive twisting by the secondary bearing surface 45 of the first shearing member 24. Bending the severed ends defines an opening between the severed ends of the chain link greater than the thickness of the chain link.

Referring to FIG. 7, a support system 70 is provided to support the first and second shearing members 24, 26 and to allow the second shearing member 26 to rotate. The support system 70 includes a mounting block 72, a support plate 74, and a main pivot bolt 76. The mounting block 72 mounts the first shearing member 24 to the housing 22 and secures the first shearing member 24 in a substantially fixed position. The mounting block 72 is mounted to a first side panel 80 of the housing 22 by welds 81 or other fastening techniques, for example.

Referring to FIGS. 7 and 8, the mounting block 72 includes a main bore 84 having a counterbore 86 to accommodate the threaded portion of the main pivot bolt 76 and to engage the head of the main pivot bolt 76 to retain it. The mounting block 72 includes first and second mounting bores 88, 89 each having a counterbore 90, 91. First and second mounting bolts 92, 93 extend through the mounting bores 88, 89. The counterbores 90, 91 engage the heads of the mounting bolts 92, 93 to retain them. The threaded portions of the mounting bolts 92, 93 threadingly engage first and second tapped mounting holes 94, 95, respectively, of the first shearing member 24 to secure the first shearing member 24.

Referring to FIG. 7, the support plate 74 is provided to support the pivot bolt 76. The support plate 74 includes a blind, tapped hole 97. The support plate 74 is mounted to a second side panel 100 of the housing 22 across from the mounting block 72 by welds 101 or other fastening techniques, for example. The hole 97 of the support plate 74 threadingly engages the threaded portion of the pivot bolt 76.

The pivot bolt 76 is provided to serve the dual purpose of securing one side of the first shearing member 24 and of providing a fulcrum about which the second shearing member 26 can pivot. The pivot bolt 76 acts as a rod that extends through the second shearing member 26. The pivot bolt 76 is supported at each end by the housing 22. The pivot bolt 76 defines one end point of a first lever arm 102 of the second shearing member 26, as shown in FIG. 5. Referring to FIG. 7, the pivot bolt 76 extends through the main bore 84 of the mounting block 72, a main hole 103 of the first shearing member 24, the fulcrum hole 63 of the second shearing member 26, a thrust bearing 104, a flange nut 106, and a jam nut 108 and threadingly engages the support plate 74.

To minimize the spreading of the shearing members 24, 26 relative to each other, the thrust bearing 104, the flange nut 106 and the jam nut 108 are threaded onto the pivot bolt 76 and are disposed to hold the shearing members 24, 26 between the thrust bearing 104 and the mounting block 72. A setscrew 110 is disposed in the flange nut 106 to selectively prevent the nut 106 from moving. A setscrew can also be similarly disposed in the jam nut 108.

In the case where the apparatus 20 is used to cut wire rope having a small diameter, 1/32 inch, for example, the clearance between the shearing members 24, 26 becomes an important consideration. The support system 70 allows the clearance between the shearing members 24, 26 to be controlled such that wire rope having a diameter as small as 1/32 inch, for example, can be cut.

Referring to FIGS. 9 and 10, in another embodiment of the support system, an L-shaped wall member 115 acts as a keeper and is disposed such that the shearing members 24, 26 are disposed between the mounting block 72 and the wall member 115. The wall member 115 is mounted to the second side panel 100 and a top panel 116 of the housing 22 by welds 117 or other fastening techniques, for example. The wall member 115 is provided to further retain the shearing members 24, 26 in a cooperatively shearing relationship. The wall member 115 includes a hole 119 to accommodate the main pivot bolt 76 and the thrust bearing 104. A washer 121, which is integral with the flange nut 106, is disposed adjacent the thrust bearing 104 to distribute the tightening force applied by the jam nut 108. A setscrew 123 is threaded through the mounting block 72 and engages the head of the pivot bolt 72 to prevent the unintentional rotation of the pivot bolt 76. The support system shown in FIGS. 9 and 10 is similar in other respects to the above-described support system 70 shown in FIGS. 7 and 8.

Figure 11:
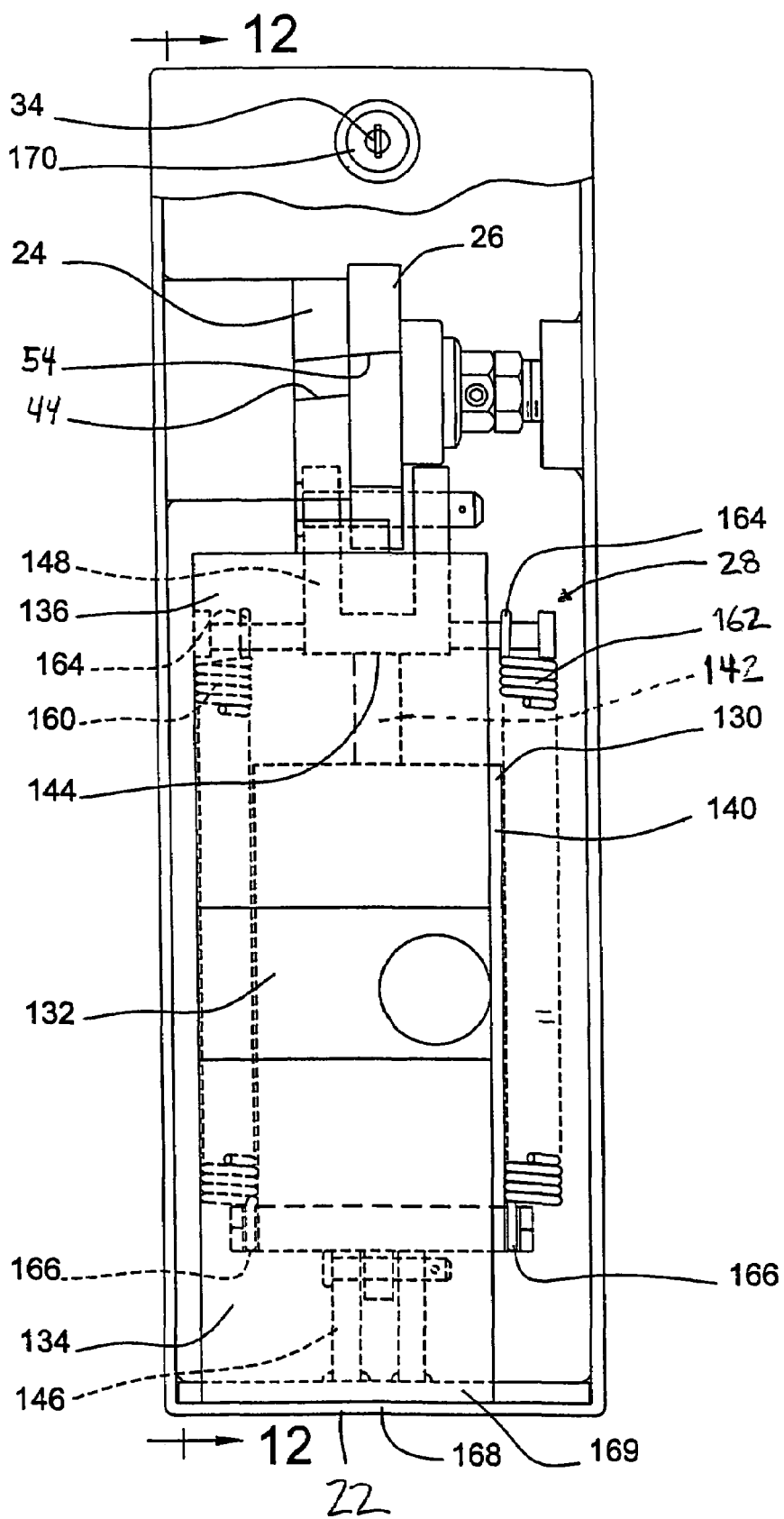
FIG. 11 is a front elevational view of the chain cutting apparatus of FIG. 1 with a portion of the housing removed.
Figure 12:
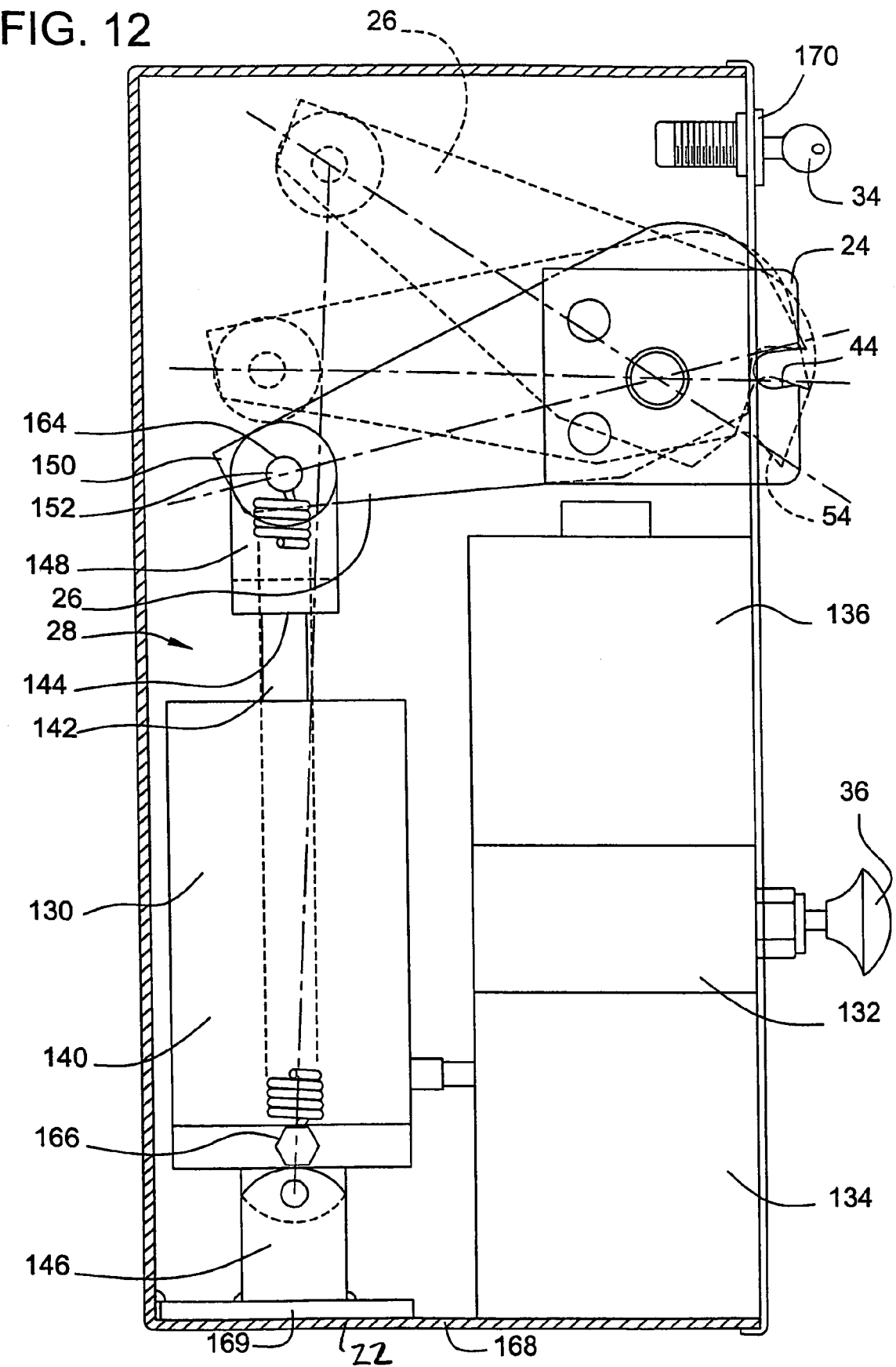
FIG. 12 is a cross-sectional view taken along line 12—12 of FIG. 11 illustrating the operational parts of the chain cutting apparatus.

Referring to FIGS. 11 and 12, the electro-hydraulic actuator system 28 is provided to cooperate with the second shearing member 26 and is selectively operable to move automatically the second shearing member 26 between the open position and a cutting position to generate the shearing and bending action between the primary bearing surfaces 44, 54 of the first and second shearing members 24, 26, respectively. The actuator system 28 is selectively operable to move automatically the second shearing member 26 relative to the first shearing member 24 to shear and bend the chain link to define an opening in the chain link greater than the thickness of the chain link. The actuator system 28 moves the second shearing member 26 smoothly and consistently through a substantially uniform stroke. The actuator system 28 requires no priming.

The actuator system 28 includes a hydraulic cylinder 130, a pump 132, a reservoir 134, and an electric motor 136. The hydraulic cylinder 130 is cooperatively arranged with the second shearing member 26 such that the cylinder 130 is operable to move the second shearing member 26 to a cutting position to cut the chain link or cable. The pump 132 is fluidly connected to the cylinder 130 for driving the cylinder 130. The reservoir 134 has a quantity of hydraulic fluid. The pump 132 is fluidly connected to the reservoir 134 for drawing the hydraulic fluid from the reservoir 134 and pumping the hydraulic fluid under pressure to the hydraulic cylinder 130. The motor 136 is operatively connected to the pump 132 for selectively driving the hydraulic cylinder 130. The motor 136 selectively powers the pump 132, which in turn drives the hydraulic cylinder 130.

The cylinder 130 is a single-action type cylinder, such as a seven-ton single acting type, for example. The hydraulic cylinder 130 has a base 140 and a driving rod 142 with a distal end 144. The driving rod 142 is movable between a retracted position and an extended position, having a 4½ inch stroke, for example.

To allow the cylinder 130 to articulate with its stroke, the base 140 of the cylinder 130 is pivotally mounted to a base clevis 146, which is in turn mounted to the housing 22. A rod clevis 148 is mounted to the distal end 144 of the driving rod 142. A pivot end 150 of the movable shearing member 26 is pivotally mounted to the rod clevis 148 by a pin 152. The pin 152 at the pivot end 150 and the pivot bolt 76 disposed in the fulcrum hole 103 define a lever arm of the second shearing member 26.

The driving rod 142 of the hydraulic cylinder 130 operates upon the lever arm for producing the shearing action between the first and second shearing members 24, 26. The driving rod 142 moves the movable shearing member 26 between the open position and a cutting position. When the driving rod 142 is in the retracted position, the movable shearing member 26 is in the open position. When the driving rod 142 is in the extended position, the movable shearing member 26 is in a cutting position.

A pair of return springs 160, 162 is cooperatively arranged with the cylinder 130 to bias the driving rod 142 to the retracted position, thereby positioning the movable shearing member 26 in the open position. Each spring 160, 162 includes a pair of ends 164, 166 which are respectively mounted to the distal end 144 of the driving rod 142 at the rod clevis 148 and to the base 140 of the cylinder 130.

To spread the force loading associated with the cylinder 130 over a larger area to minimize deflection of the housing 22, a cylinder base plate 169 is provided. The base plate 169 is mounted to the housing 22 and is disposed between the base 140 of the hydraulic cylinder 130 and the base 168 of the housing 22

The entire hydraulic system is closed. In operation, the pump 132 draws an amount of hydraulic fluid from the reservoir 134 and pumps the fluid under pressure to the hydraulic cylinder 1130 on the power stroke thereof, thereby moving the driving rod 142 to the extended position. The springs 160, 162 elongate and urge the driving rod 142 to the retracted position. The spring force acts to return the driving rod 142 to the retracted position, which in turn forces the hydraulic fluid back into the reservoir 134. The electro-hydraulic actuator system 28 moves the second shearing member 26 smoothly and consistently through a substantially uniform stroke at a substantially steady rate to allow the shearing members to deliver a substantially constant force.

The motor 136 is electrically operated and is provided to drive the pump 132. The electric motor 136 can be a ¼ Hp motor that operates on 115VAC, 60 Hz, single phase power, for example. The ready availability of such power facilitates the installation and portability of the apparatus 20. The motor 136 includes an internal auto-reset thermal overload protection device as an added safety feature. In other embodiments, the motor can be a type that operates on DC voltage.

Because the electro-hydraulic actuator system 28 moves the second shearing member 26 relative to the first shearing member 24, the shearing member 26 can move at a rate substantially above the cutting members of manually-pumped prior art cutting devices. It has been determined through experimentation that the cutting speed at which the second shearing member 26 moves is an important design consideration in maintaining the cutting edge and fracture resistance of the shearing members 24, 26 when the apparatus 20 is used to cut hardened chain. The actuator system 28 can be configured to drive the second shearing member 26 at a selected rate. The hydraulic cylinder 130 drives the shearing and bending portion 32 of the second shearing member 26 preferably below a speed of about 0.2 inches per second, more preferably at a speed of about 0.10 inches per second, and even more preferably at a speed of about 0.096 inches per second.

To provide a safety feature for the user and to provide full control of the operation of the chain cutting apparatus 20, a key-activated switch 170 is mounted to the housing 22 and electrically arranged with the motor 136. The switch 170 allows for selective operation of the motor 136. The key-activated switch 170 is movable by the key 34 between an operating position, in which the motor 136 is running to operate the chain cutting apparatus 20, and an off position, in which the motor 136 is shut off, thereby stopping the chain cutting apparatus 20. The key-activated switch 170 is configured such that the switch 170 is biased to the off position by a spring, for example. When the switch 170 is in the operating position, releasing the key 34 allows the switch 170 to return to the off position, thereby ceasing the cutting operation. The key-activated switch 170 can help provide a further safety feature by limiting the use of the chain cutting apparatus 20 to only authorized, trained personnel.

Figure 13:
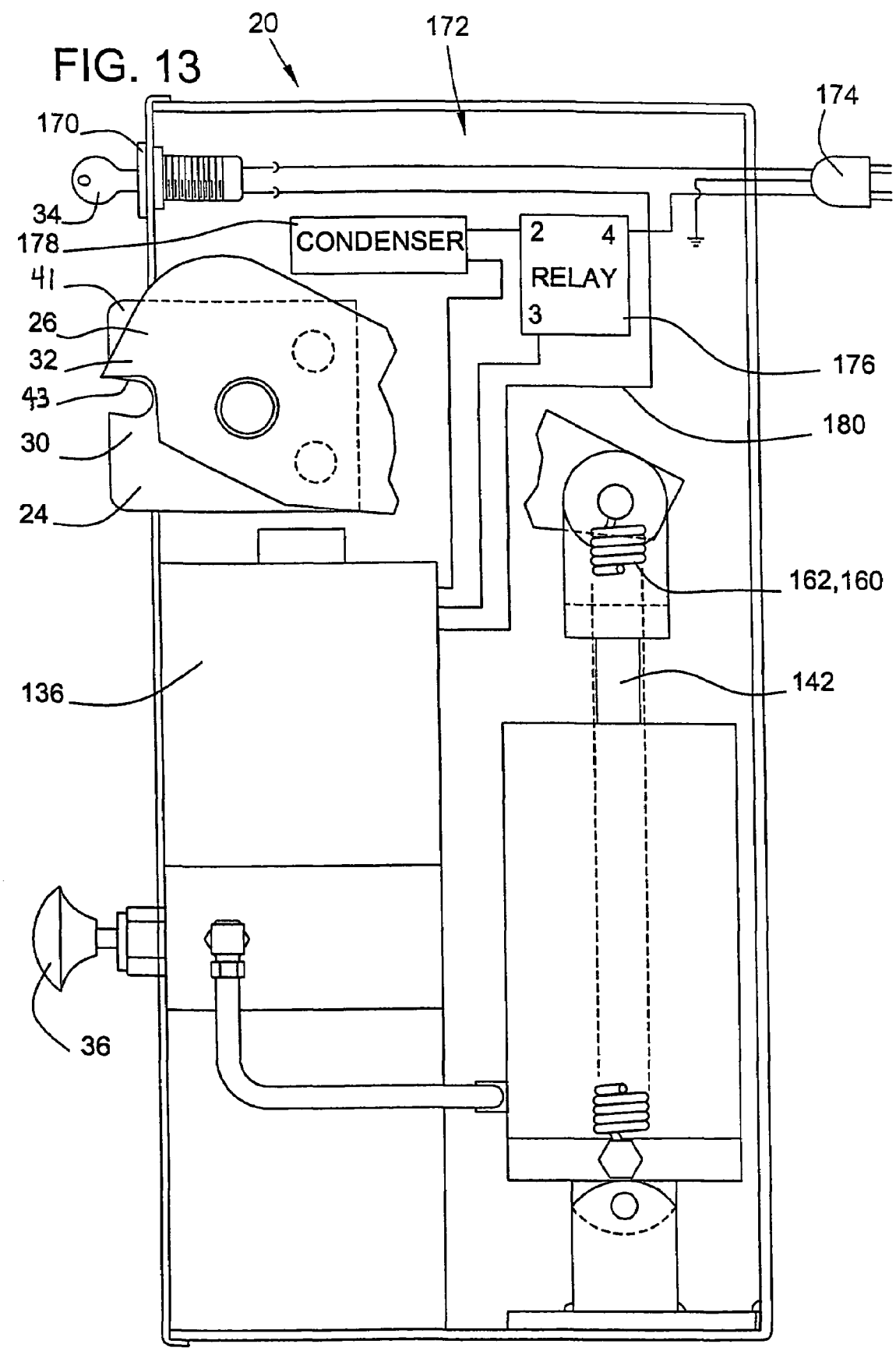
FIG. 13 is a diagrammatic general schematic view of an ignition system for a motor of the chain cutting apparatus of FIG. 1.

Referring to FIG. 13, the key-activated switch 170 is part of an ignition system 172 for electrically operating the motor. The switch 170 is electrically connected to a plug 174 that can be mated to an outlet in a standard convenience receptacle. A relay 176 and a condenser 178 are electrically connected to the plug 174 and the motor 136, thereby forming a circuit 180 between the switch 170 and the motor 136. Upon movement of the switch 170 to the operating position, the circuit 180 is closed, thereby allowing electricity to flow to the motor 136, which in turn starts to operate. Releasing the key 34 allows the switch 170 to move to the off position, which in turn opens the circuit 180, thereby interrupting the flow of electricity to the motor 136. Accordingly, the motor 136 stops running.

In other embodiments of the apparatus including an electro-hydraulic actuator system having a DC motor, the relay 176 and the condenser 178 of the circuit 180 can be replaced with a comparable AC/DC rectifier.

To operate the apparatus 20, the operator obtains the key 34 for the switch 170. A chain or cable for cutting is selected and placed in the jaw 43 of the first shearing members 24. The chain link can be positioned such that a portion of the chain link extends through the shearing plane 41. An eye guard can be placed over the shearing and bending portions 30, 32 of the first and second shearing members 24, 26. The operator inserts the key 34 into the switch 170 and rotates the key 34 to the operating position. The operator holds the key 34 in the operating position to operate the apparatus 20 so that the second shearing member 26 undergoes its cut and open stroke. When the selected chain or cable is cut and opened, the operator relaxes his hold on the key 34, thereby allowing the switch 170 to move to the off position. When the switch 170 is in the off position, the motor 136 stops running which ceases the cut and open stroke of the second shearing member 26.

The internal bypass of the hydraulic cylinder 130 is opened momentarily by opening the dump valve 36 to release any residual hydraulic fluid pressure acting upon the driving rod 142, thereby allowing the springs 160, 162 to position the driving rod 142 to its fully retracted position, thereby moving the second shearing member 26 to the open position, as shown in FIG. 13. It should be noted that the driving rod stroke can be minimized by designing the various components and positioning them in such a manner that the fully retracted driving rod 142 defines the clockwise limit of travel of the second shearing member 26.

When the driving rod 142 is in the retracted position, the chain cutting apparatus 20 is ready to accept the next selected chain link or cable for cutting. The operator can remove the cut link or cable from the fully open jaws. The key 34 for the switch 170 can be returned to its controlled storage location.

Referring to FIG. 5, the illustrative first lever arm 102 has a length of 5.5 inches. An illustrative second lever arm 190 has a length of 1.625 inches. In embodiments of the chain cutting apparatus having such lever arms 102, 190 and a hydraulic cylinder that delivers a force between about 6,000 and about 14,000 lbs. at a rate of about 0.330 inches per second, the jaw 55 of the second shearing member 26 can deliver a shear force between about 20,310 and about 47,404 lbs. at a rate of about 0.096 inches per second.

The first and second lever arm lengths 102, 190 of the second shearing member 26 and the stroke of the driving rod are selected to cause the primary bearing surface 54 of the second shearing member 26 to move past the primary bearing surface 44 of the first shearing member 24 to continue bending the link after it has been severed, as shown in phantom lines in FIG. 12.

It will be appreciated that the shearing members are preferably of substantial width for at least two reasons. First, the high stresses to which the members are subjected require that the members have sufficient strength to perform the above described shearing and bending operations without permanent distortion which would impair the subsequent operation of the apparatus. Second, the bearing surfaces must be of sufficient area to assure that they positively engage the severed ends of the link being cut and bent apart.

On the other hand, shearing members of excessive width increase both the cost and weight of the apparatus. It is preferable, but not essential, that the members be of substantially equal width so that they act similarly on both severed ends of the link. It will be understood that in other embodiments the width of the shearing members can vary. Satisfactory results have been achieved using ¾ inch wide steel shearing members to cut and open ⅜ inch products and 1 inch wide shearing members to cut and open ½ inch products.

The distribution of mass in both the first and the second shearing members to provide adequate tensile strength at the points of highest stress and shock is important to maintaining shearing member integrity. The shearing members are configured to provide an adequate amount of mass and cross section at high stress points to give the necessary strength for fracture and cracking resistance. The points of highest stress are located above the jaw on the second, movable shearing member and below the jaw on the first, stationary shearing member. It has been determined that the movable shearing member made from solid tool steel has a critical mass with a minimum cross section of 1.65 in.$^2$ for embodiments of shearing members having a ¾ inch width and of 2.24 in.$^2$ for embodiments of shearing members having a 1 inch width. The stationary shearing member made from solid tool steel has a critical mass with a minimum cross section of 1.46 in.$^2$ for embodiments of shearing members having a ¾ inch width and of 2.10 in.$^2$ for embodiments of shearing members having a 1 inch width.

In other embodiments, the shearing members can be made with hardened tool steel inserts that are secured with dowel pins of other fastening means. The hosting body for such an embodiment can be a hardened high carbon steel.

The shearing members can be made from any suitable tool steel, for example, such as O1, S-7, M-2, D-2, A-2, or A-6. Preferably the material of the shearing members is tough enough to withstand the shock of shearing and snapping hardened chain links and is durable enough to continue to maintain a keen shearing edge over many cuts. To maximize shock resistance, performance, and cutting edge durability, the shearing members are preferably made from S-7 tool steel, hardened to 59–60 Rc, and double tempered.

The mechanical advantage achieved through the use of the actuator system and the lever arm enables large gauge chain to be easily cut. The apparatus 20 is designed to create an opening between the severed ends sufficient to allow the sheared and bent link to be removed from the adjacent intact links. As explained above, throughout the shearing and bending operations the secondary bearing surface 45 of the first shearing member 24 bears upon the link to prevent excessive twisting of the link which might otherwise result. The twisting, if unrestrained, would impair the capacity of the apparatus to generate a sufficient opening through which the adjacent intact links could be removed. The apparatus can cut chain links as large as ½ inch thick made from grade 100 metal, for example, and can cut wire rope as small as 1/32 inch, for example.

From the above detailed description, it is clear that under normal operating conditions, the apparatus should require little maintenance. Adjusting the support system 70 can readily compensate for any wear between the shearing members 24, 26. Should the shearing edges 42, 52 become worn or chipped, the shearing members 24, 26 may be readily removed for sharpening or replacement. Such measures should be required infrequently, however, as the machine is protected against harm resulting from excessive strain through the safeguard of spacing primary and second bearing surfaces 44, 45 of the first shearing member 24 to accept only chains of manageable size.

It is also apparent from the description and drawings that bolts, cable, and other items having small cross sections can be sheared with the apparatus. The overtravel of the primary bearing surface 54 of the second shearing member 26 beyond the primary bearing surface 44 of the first shearing member 24, utilized to open a chain link after it has been severed, is superfluous for these operations.

In addition, it will be understood that the chain cutting apparatus can be operable with longer or shorter shearing members, faster or slower pumps creating different hydraulic pressures, and different cylinders having different cylinder bores and strokes. Hydraulic valves and other devices, such as, flow controls or pressure switches, for example, can be manually or electrically actuated. Limit switches can be used to prevent overtravel. Double-acting cylinders can be used instead of the illustrative single-acting, spring-return cylinder. Various combinations of these components are possible in other embodiments of the chain cutting apparatus of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for automatically shearing and bending a chain link, the chain link including a selected thickness, the apparatus comprising:

a housing;

a first shearing member mounted to the housing;

a second shearing member, the second shearing member pivotally mounted to the housing for movement substantially parallel to the shearing plane, the second shearing member arranged with the first shearing member for relative shearing action between the first and second shearing members; and an electro-hydraulic actuator system cooperating with the second shearing member, the actuator system selectively operable to move automatically the second shearing member relative to the first shearing member to shear the chain link and to bend the chain link to define an opening in the chain link greater than the thickness of the chain link, the actuator system including a hydraulic cylinder, a pump, a motor, and a reservoir, the hydraulic cylinder, the pump, the motor, and the reservoir disposed within the housing, the hydraulic cylinder mounted to the second shearing member for movement thereof, the pump fluidly connected to the hydraulic cylinder for driving the hydraulic cylinder, the motor operatively connected to the pump for selectively driving the pump, the hydraulic cylinder having a base and a driving rod with a distal end, the base pivotally mounted to the housing, the distal end of the rod mounted to the second shearing member for moving the second shearing member, the reservoir having a quantity of hydraulic fluid, the pump fluidly connected to the reservoir and to the hydraulic cylinder for drawing the hydraulic fluid from the reservoir and pumping the hydraulic fluid under pressure to the hydraulic cylinder, the hydraulic cylinder fluidly connected to the reservoir to thereby fluidly connect the reservoir, the pump, and the hydraulic cylinder in a closed loop circuit.

2. The apparatus as set forth in claim 1 wherein the actuator system includes a spring for biasing the second shearing member to an open position wherein the first and second shearing edges are disposed apart from each other.

3. The apparatus as set forth in claim 1 wherein the second shearing member is in the form of a lever and includes a pivot end, the chain cutting apparatus includes a rod extending through the second shearing member and supported at each end by the housing, the rod being a fulcrum for the second shearing member, the pivot end and the rod defining a lever arm of the second shearing member, and the driving rod of the hydraulic cylinder operates upon the lever arm for producing the shearing action between the first and second shearing members.

4. The apparatus as set forth in claim 3 wherein the rod comprises a bolt.

5. The apparatus as set forth in claim 1 wherein a base plate is mounted to the housing and disposed between the base of the hydraulic cylinder and the housing.

6. The apparatus as set forth in claim 1 wherein the second shearing member is driven by the hydraulic cylinder below a speed of about 0.200 inches per second.

7. The apparatus as set forth in claim 6 wherein the second shearing member is driven by the hydraulic cylinder at a speed of about 0.096 inches per second.

8. The apparatus as set forth in claim 1 wherein the actuator system further comprises a dump valve for resetting the actuator system such that the second shearing member is in an open position.

9. The apparatus as set forth in claim 8 wherein the dump valve projects through a front cover of the housing.

10. The apparatus as set forth in claim 1 wherein the actuator system moves the second shearing member smoothly and consistently through a substantially uniform stroke.

11. The apparatus as set forth in claim 10 wherein the actuator system moves the second shearing member at a substantially steady rate to allow the shearing members to deliver a substantially constant force to the chain link.

12. The apparatus as set forth in claim 2 wherein the driving rod is reciprocally movable over a range of travel between a retracted position and an extended position, the driving rod being in the refracted position when the second shearing member is in the closed position, the driving rod being in the extended position when the second shearing member is in a cutting position, the spring developing a return force when the second shearing member is in the cutting position, the return force aging the driving rod to the retracted position to thereby convey hydraulic fluid disposed in the hydraulic cylinder to the reservoir.

13. The apparatus as set forth in claim 12 wherein the spring includes a pair of ends, the ends being respectively mounted to the base of the cylinder and the distal end of the driving rod.

14. An apparatus for automatically shearing and bending a chain link, the chain link including a selected thickness, the apparatus comprising:

a housing;

a first shearing member mounted to the housing;

a second shearing member, the second shearing member pivotally mounted to the housing for movement substantially parallel to the shearing plane, the second shearing member arranged with the first shearing member for relative shearing action between the first and second shearing members;

an electro-hydraulic actuator system cooperating with the second shearing member, the actuator system selectively operable to move automatically the second shearing member relative to the first shearing member to shear the chain link and to bend the chain link to define an opening in the chain link greater than the thickness of the chain link, the actuator system including a hydraulic cylinder, a pump, a motor, and a reservoir, the hydraulic cylinder operably arranged with the second shearing member for movement thereof, the pump fluidly connected to the hydraulic cylinder for driving the hydraulic cylinder, the motor operatively connected to the pump for selectively driving the pump, the hydraulic cylinder having a base and a driving rod with a distal end, the base mounted to the housing, the driving rod movable with respect to the base and arranged with the second shearing member for moving the second shearing member, the reservoir having a quantity of hydraulic fluid, the pump fluidly connected to the reservoir and to the hydraulic cylinder for drawing the hydraulic fluid front the reservoir and pumping the hydraulic fluid under pressure to the hydraulic cylinder; and a spring for biasing the second shearing member to an open position wherein the first and second shearing edges are disposed apart from each other, the spring including a pair of ends, the ends being mounted to the base of the cylinder and the distal end of the rod.

* * * * *

UNITED STATES PATENT AND TRADEMARK OFFICE
CERTIFICATE OF CORRECTION

| | |
|---|---|
| PATENT NO. | : 7,137,284 B2 |
| APPLICATION NO. | : 11/214368 |
| DATED | : November 21, 2006 |
| INVENTOR(S) | : McCarthy et al. |

It is certified that error appears in the above-identified patent and that said Letters Patent is hereby corrected as shown below:

Column 1, Line 63, "jacks" should read -- jack --.

Column 3, Line 47, "FIG. 1" should read -- FIG. 1; --.

Column 8, Line 36, "1130" should read -- 130 --.

Column 13, Claim 12, Line 43, "refracted" should read -- retracted --.

Column 13, Claim 12, Line 48, "aging" should read -- urging --.

Signed and Sealed this

Tenth Day of April, 2007

JON W. DUDAS
*Director of the United States Patent and Trademark Office*